United States Patent
Hedrei

[15] 3,703,196
[45] Nov. 21, 1972

[54] SYSTEM FOR CONTROLLING THE SETTING OF A QUADRUPLE BAND SAW

[72] Inventor: Constantin Hedrei, Montreal, Quebec, Canada

[73] Assignee: Forano Limitee, Montreal, Quebec, Canada

[22] Filed: Oct. 16, 1970

[21] Appl. No.: 81,380

[52] U.S. Cl. .................................. 83/806, 83/661
[51] Int. Cl. .......................................... B27b 15/08
[58] Field of Search ....143/5, 17, 22, 32 Q, 37, 37 B, 143/115, 120, 120 A; 144/3 P; 83/201.08, 201.09, 201.1, 201.11, 201.13

[56] References Cited

UNITED STATES PATENTS

| | | | |
|---|---|---|---|
| 3,318,347 | 5/1967 | Alich | 143/22 |
| 3,086,568 | 4/1963 | Hartzell | 143/120 A X |
| 3,534,789 | 10/1970 | Morris | 143/37 B |
| 3,552,455 | 1/1971 | Pinat | 143/22 |
| 138,443 | 4/1873 | Sillman | 143/22 |

*Primary Examiner*—Andrew R. Juhasz
*Assistant Examiner*—James F. Coan
*Attorney*—Raymond A. Robic

[57] ABSTRACT

A system for controlling the setting of a quadruple band saw having a fixed frame, a pair of rear and a pair of front sliding bases slidably mounted on the fixed frame and respectively supporting a pair of saw blades, and a drive unit for operating each pair of sliding bases in synchronism. The system comprises a first device for controlling the drive unit of the rear pair of sliding bases, and a second device for controlling the drive unit of the front pair of sliding bases to adjust the distance of the front pair of saw blades with respect to the rear pair of saw blades when the rear pair of saw blades is stationary and for maintaining a relative distance between the front and rear pairs of saw blades when the rear pair of saw blades is moving.

9 Claims, 11 Drawing Figures

Fig. 1

INVENTOR
Constantin HEDREI

ATTORNEY

INVENTOR
Constantin HEDREI

ATTORNEY

INVENTOR
Constantin HEDREI

ATTORNEY

Fig. 7

INVENTOR
Constantin HEDREI

ATTORNEY

INVENTOR
Constantin HEDREI

ATTORNEY

SYSTEM FOR CONTROLLING THE SETTING OF A QUADRUPLE BAND SAW

This invention relates to a system for controlling the setting of a quadruple band saw.

Quadruple band saws generally comprise a fixed frame, a pair of rear and a pair of front sliding bases slidable mounted on the fixed frame and respectively supporting a pair of saw blades. Each pair of rear and front sliding bases is moved transversely on the fixed frame by means of a separate drive unit. Such quadruple band saws are very useful because they permit to cut three separate pieces of wood at a time in the same log, namely a first piece using the rear pair of saw blades and two other pieces, one on each side of such first piece using the front pair of saw blades.

In the known machines, the distances between the rear pair of saw blades and between the front pair of saw blades are adjusted separately and thus, when the distance between the rear pair of saw blades is varied, it becomes necessary to readjust the distance between the front pair of saw blades. However, in a number of cases, the relative distance between the rear and front pairs of saw blades which determines the thickness of the piece os wood sawed on either side of the first piece of wood does not vary. Such readjustment of the front pair of saw blades is therefore time-consuming and consequently results in an increase in the price of lumber.

It is therefore the object of the present invention to provide a control system for the setting of a quadruple band saw which permits to move simultaneously the rear and front pairs of saw blades equal distances from the center line of the quadruple band saw while maintaining a preset relative distance between the front and rear pairs of saw blades. The control system also permits to adjust the position of the front pair of saw blades with respect to the rear pair of saw blades.

The control system, in accordance with the invention, comprises a first device for controlling the drive unit of the rear pair of sliding bases and a second device for controlling the drive unit of the front pair of sliding basses to adjust the distance of the front pair of saw blades with respect to the rear pair of saw blades when the rear pair of saw blades is stationary, and for maintaining a preset relative distance between the front pair of saw blades and the rear pair of saw blades when the rear pair of saw blades is moving.

The first control device includes switching means located in the energizing circuit of the rear drive unit and corresponding to the number of preset positions of the rear pair of saw blades, and positioning means responsive to movement of the rear sliding bases a distance corresponding to a preset position for operating a corresponding one of the switching means to deenergize the rear drive unit.

The second control device includes switching means positioned in the energizing circuit of the drive unit of the front pair of saw blades and corresponding to the number of preset positions of the front pair of saw blades, and positioning means associated with the front sliding bases and responsive to the displacement of the front sliding bases when the rear sliding bases are stationary for operating a switching means corresponding to a preset position of the front saw blades to denergize the front drive unit when the preset position is reached.

The second control device further includes means responsive to the movement of the rear sliding bases under the control of the first device to energize the front drive unit to maintain a relative distance between the rear and front pairs of saw blades.

The invention will be disclosed in more detail, by way of example, with reference to the description of a preferred embodiment thereof and to the accompanying drawings in which.

Figure 1:
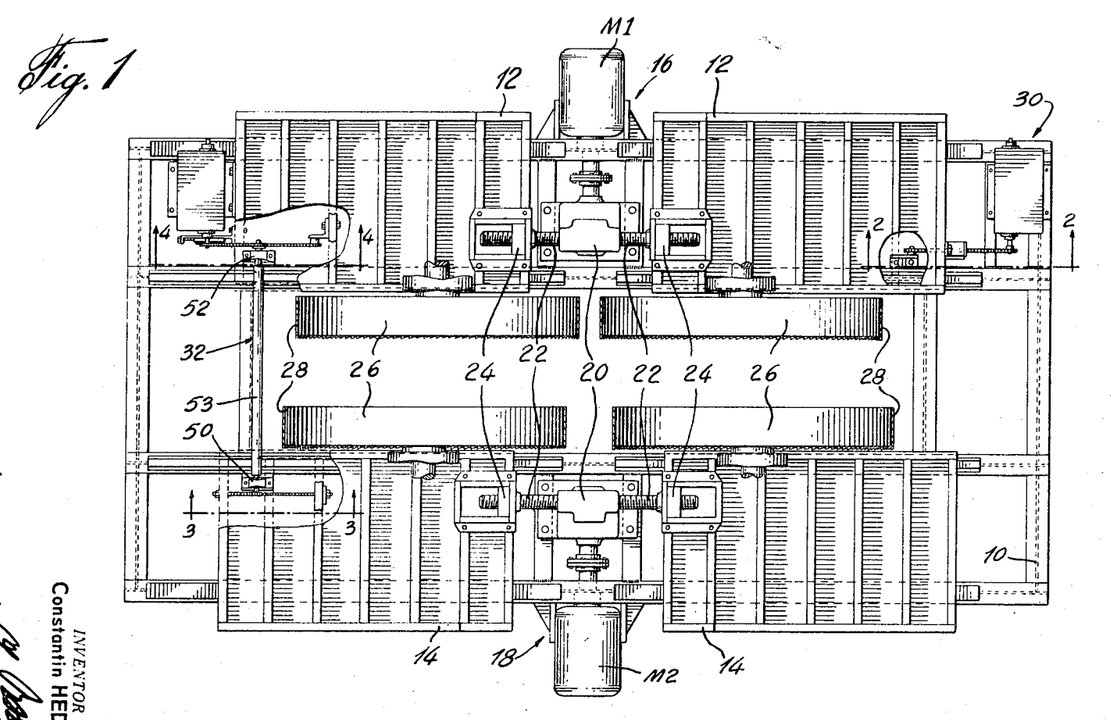
FIG. 1 illustrates a schematic view of the fixed frame, the sliding bases, the drive units and the control devices of a quadruple band saw.

Referring to FIG. 1, there is shown a quadruple band saw including a fixed frame 10 upon which are mounted a rear pair of sliding bases 12 and a front pair of sliding bases 14. The rear sliding bases 12 are moved in synchronism towards or away from each other by means of a conventional drive unit 16. Similarly, the front sliding bases 14 are moved in synchronism towards or away from each other by means of a separate drive unit 18 identical to drive unit 16. Drive units 16 and 18 comprise a motor M1 and M2 respectively driving a gear box 20 having two threaded output shafts 22 coupled to nuts 24 secured to the sliding bases. The two shafts of gear box 20 rotate at the same speed and the threads thereof are arranged to move the sliding bases in synchronism towards or away from each other.

To each rear and front sliding bases is rotatably attached a pair of large wheels 26 holding a saw blade 28 in a known manner. The wheels 26 are positioned on the sliding bases 12 so that the blades of each pair of saw blades are equally spaced from the center line of the quadruple band saw.

The control device of the drive units consists of a first device indicated generally in FIG. 1 by reference numeral 30 and a second device indicated generally by reference numeral 32. Generally speaking, the first device 30 controls the drive unit of the rear pair of sliding bases. The second device 32 controls the drive unit of the front pair of sliding bases to vary the distance of the front saw blades with respect to the rear saw blades when the rear saw blades are stationary. Furthermore, the second device is arranged to maintain a preset relative setting distance between the front and rear saw blades when both pairs of saw blades are moved under the control of the first device 30.

Figure 2:
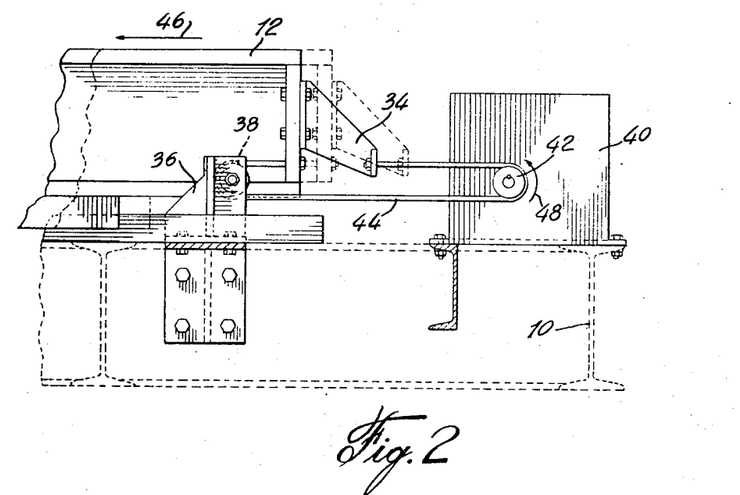
FIG. 2 illustrates a schematic view of the first device for controlling the movement of the rear sliding bases.

The control device 30 is illustrated in detail in FIG. 2 and includes a first bracket 34 secured to sliding base 12, a second bracket 36 secured to fixed frame 10 and upon which is freely mounted a chain sprocket 38, and a cam box 40 having a chain sprocket 42 fixed at the end of its shaft. A chain 44 passes around chain sprockets 38 and 42 and has one end thereof secured to sliding base 12 and the other end to first bracket 34. It will be clearly seen that movement of the sliding bases in the direction of arrow 46 will cause rotation of the shaft of the cam box 40 in the direction of arrow 48 and vice versa. The operation of the control device will be disclosed more fully in a later part of the description but it may be worthwhile to mention now that cam box 40 contains a number of cams which operate limit switches located in the energizing circuit of drive unit 16, the number of cams in the cam box 40 corresponding to the number of preset positions of the rear pair of saw blades. The control device 30 thus acts as a positioning means for monitoring the displacement of the sliding bases 12 driven by drive unit 16 and for stopping such sliding bases at a distance from the center line of the quadruple band saw corresponding to a preset position determined by the angular position of the cams on the shaft of the cam box 40.

Of course, other positioning means could be envisaged and such positioning means could include other means that chain 44 to monitor the displacement of the sliding base, and other means than a cam box for positioning the sliding base at a preset location.

Figure 3:
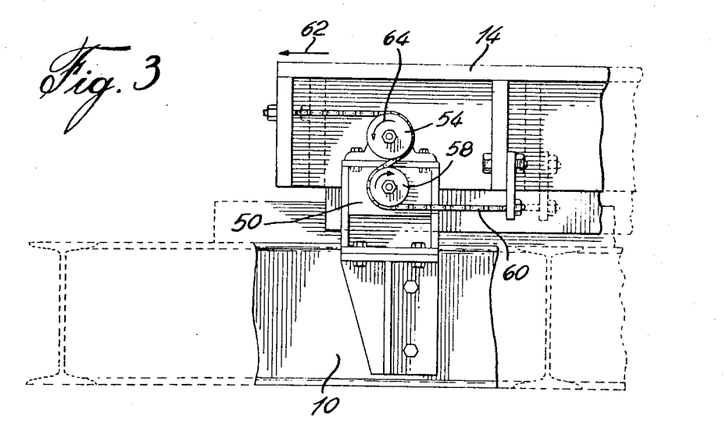
FIGS. 3 and 4 illustrate the device for controlling the movement of the front sliding bases while maintaining a relative distance between the front and rear sliding bases when the rear sliding bases are moved under the control of the first device.
Figure 4:
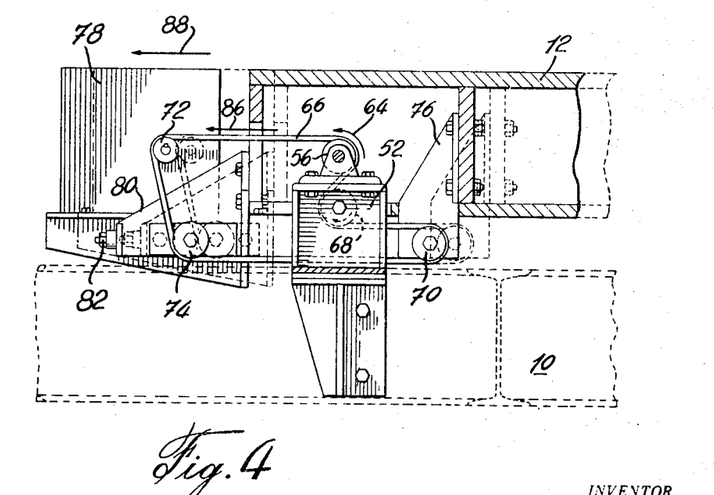

The control device 32 illustrated generally in FIG. 1 is shown in more detail in FIGS. 3 and 4 of the drawings. It comprises a first bracket 50 fixed to frame 10 at the front saw side and a second bracket 52 fixed to frame 10 at the rear saw side. A shaft 53 is journalled in brackets 50 and 52 and carries a chain sprocket 54 keyed at the front end thereof and a chain sprocket 56 keyed at the back end thereof. A chain sprocket 58 is mounted freely on bracket 50 and a chain 60 passes around chain sprockets 54 and 58 and both ends of such chain are secured to sliding base 14. It will be easily seen that displacement of the sliding base 14 in the direction of arrow 62 will cause the rotation of shaft 52 in the direction of arrow 64 and vice versa.

At the rear end of shaft 52, a chain 66 interconnects chain sprocket 56 with four other chain sprockets 68, 70, 72 and 74. Chain sprocket 68 is freely mounted on bracket 52; chain sprocket 70 is freely mounted on a bracket 76 secured to sliding base 12; chain sprocket 72 is keyed on the end of the shaft of a cam box 78 mounted on the end of sliding base 12; finally chain sprocket 74 is freely mounted on a bracket 80 having means 82 for tightening chain 66 around the various chain sprockets. Chain sprockets 68 and 70 are used to compensate for the variations in the distance between shaft 53 and the shaft of the cam box 78 when the rear sliding bases are moved.

The cam box 78 controls the energization of the drive unit 18 associated with the front saw blades and contains a number of limit switches for the purpose of positioning the front saw blades with respect to the rear saw blades. Because cam box 78 is secured to the rear sliding bases it will be seen that any displacement of the rear sliding bases will automatically displace the cams of the cam box 78 and so cause energization of the front drive unit to follow, with a slight delay, the energization of the rear drive unit. It will also be easily seen that, when shaft 52 is rotated in the direction of arrow 64 by the displacement of the front sliding bases 14, as mentioned previously, chain 66 will be moved in the direction of arrow 86 to rotate the shaft of the cam box until a predetermined cam operates a predetermined limit switch to open the energization of the drive unit 18.

It will be easily understood that other positioning means could be envisaged in place of device 32 and that such positioning means could include other means that chain 60 for monitoring the displacement of the front sliding bases 14 and other means that a cam box for positioning the sliding bases 14 at a preset location.

It is also to be understood that the first device 30 does not necessarily have to be positioned on the right hand rear side of the quadruple band saw but could also positioned on the left hand rear side of the saw provided that the second positioning device 32 is positioned on the right hand side of the saw.

Figure 5:
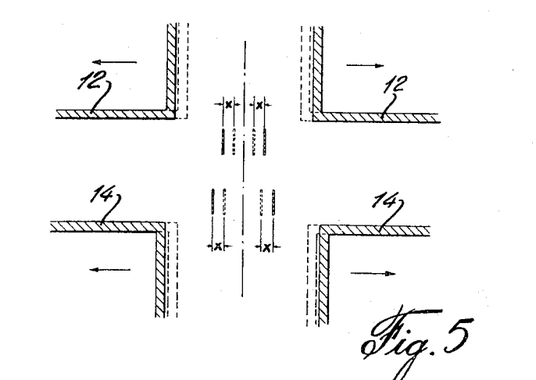
FIGS. 5 and 6 illustrate the operation of the first and the second control devices.
Figure 6:
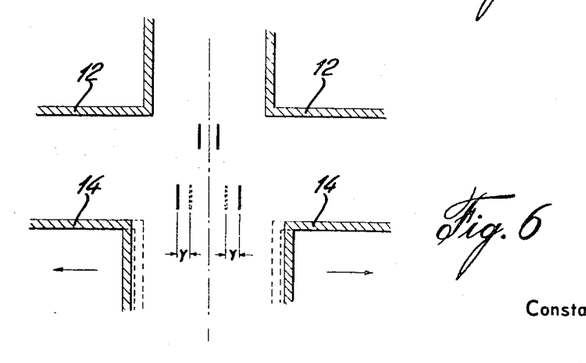

The operation of the control devices of FIGS. 2 to 4 will now be disclosed with additional reference to FIGS. 5 and 6 of the drawings. When both pairs of saw blades are moving simultaneously (FIG. 5) under the control of the first and second devices 30 and 32, the shaft 53 of the second device 32 will be rotated by the movement of front sliding bases 14 and chain 66 will move in the direction of arrow 86, for example (or in the opposite direction). However when the front sliding bases have moved, in the direction of arrow 62, a distance corresponding to the distance travelled by the rear sliding bases in the direction of arrow 88, the cams of cam box 78 will return to their original position before energization of the rear drive unit. Consequently, the front drive unit will be stopped. The relative setting distance $x$ between the front and rear saw blades will therefore remain constant as illustrated in FIG. 5.

When it is desired to vary the distance of the front saw blades with respect to the rear saw blades, the front drive unit 18 is actuated and the rear sliding bases remain stationary as illustrated in FIG. 6. Since cam box 78 secured to rear sliding bases 12 does not move, chain 66 will rotate the shaft of the cam box 78 a predetermined distance $y$ until the limit switches are operated by the preset cam of the cam box 78.

Figure 7:
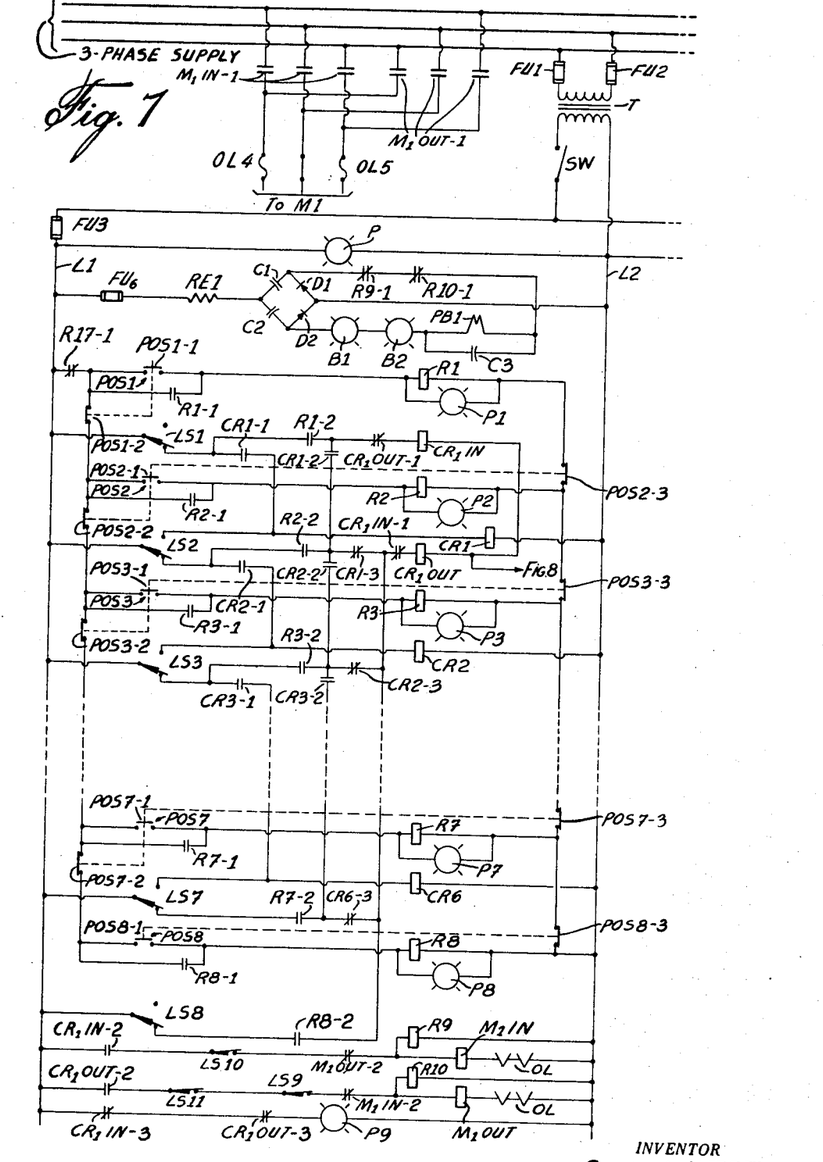
FIGS. 7 and 8, when assembled as illustrated in FIG. 9, illustrate the circuit diagram for controlling the drive units.
Figures 8, 9:
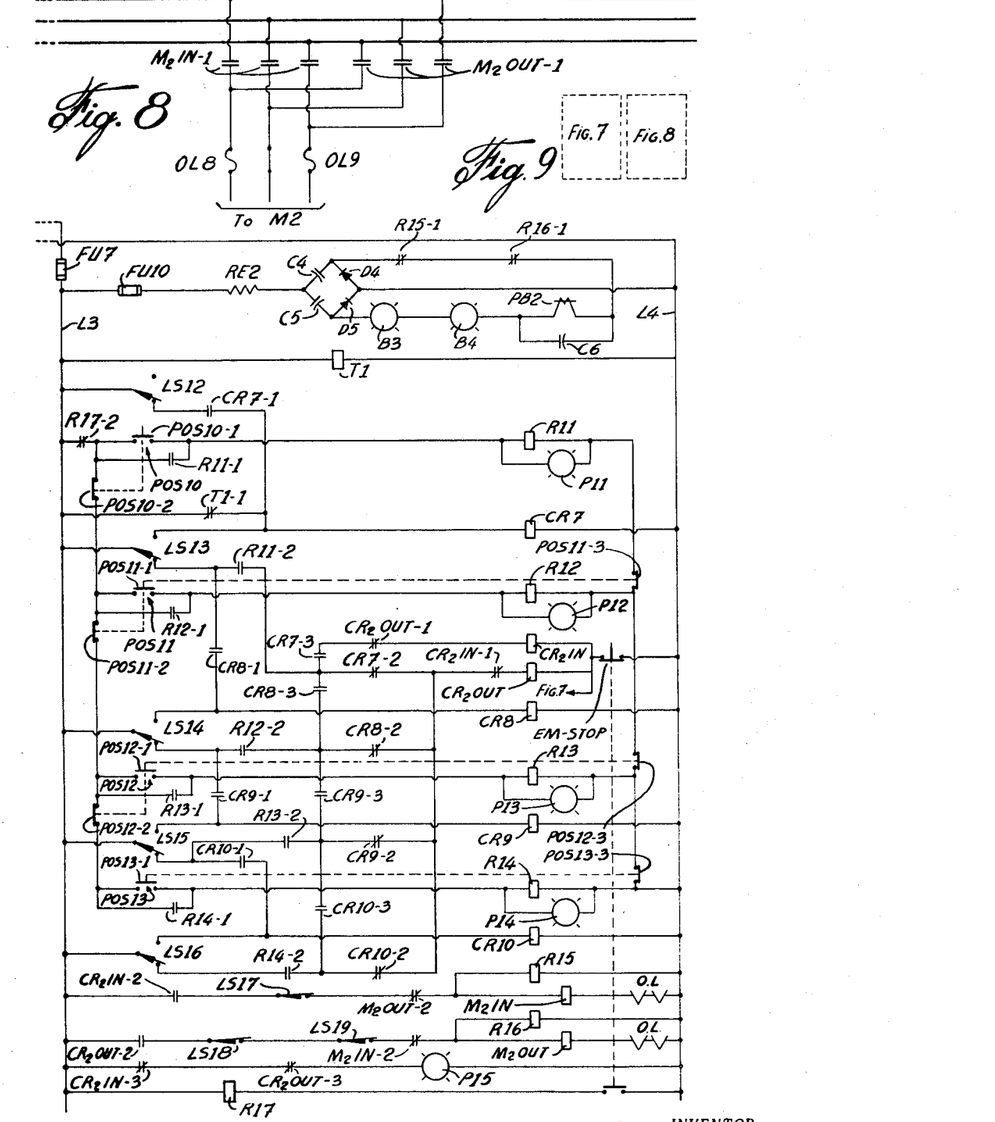

The circuit diagram for controlling the drive units 16 and 18 is illustrated in FIGS. 7 and 9, when assembled as illustrated in FIG. 9. Referring to FIG. 7, the control voltage is derived from a transformer T, the primary of which is connected across two phases of a three-phase supply through fusible elements FU1 and FU2. The secondary of transformer T is applied to line L1 and L2 through manual switch SW and fuse FU3. Closure of manual switch SW operates pilot light P which indicates that the circuit is ready for operation.

The rear drive unit 16 is powered by a three-phase motor M1 which is connected to the three-phase supply through normally open contacts and $M_1$IN-1 or $M_1$OUT-1 depending on the desired direction of rotation of the motor. The motor is protected against overload currents by heater elements OL4 and OL5.

The motor M1 is equipped with a magnetic brake which is energized through a power supply including a fusible element FU6, a resistor RE1, and a bridge circuit including two capacitors C1 and C2 and two diodes D1 and D2 forming a rectifier and voltage doubler in a known manner. The output of the bridge is applied to the winding PB1 of the brake through normally closed contacts R9-1 and R10-1 of relays R9 and R10 to be disclosed later and through two variable resistance devices B1 and B2 the resistance of which increases with the current flowing therethrough so as to apply a voltage to the winding of the brake which decreases gradually after energization of the control unit. A capacitor C3 is connected across the winding PB1 to counteract the counter electromotive force generated by winding PB1. Let us mention at this stage that contacts R9-1 and R10-1 control the release of the winding PB1 and that relays R9 and R10 operating such contacts are energized at the same time as the motor M1.

Referring to FIG. 8, the secondary of transformer T is also applied to lines L3 and L4 through fuse FU7. The front drive unit is powered by a three-phase motor M2 which is connected to the three-phase supply through normally open contacts $M_2IN-1$ or $M_2OUT-1$ depending on the desired direction of rotation of motor M2. The motor M2 is protected against overload currents by heater elements OL8 and OL9.

The front motor M2 is also equipped with a magnetic brake which is energized through a power supply including a fusible element FU10, a resistor RE2 and a bridge circuit including two capacitors C4 and C5 and two diodes D4 and D5 forming a rectifier and voltage doubler in a known manner. The output of the bridge is applied to the winding PB2 of the brake through normally closed contacts R15-1 and R16-1 of relays R15 and R16 to be disclosed later and through two variable resistance devices B3 and B4 the resistance of which increases with the current flowing therethrough so as to apply an initial high voltage to the brake, which voltage will be reduced afterwards due to the increasing voltage drop against devices B3 and B4. A capacitor C6 is connected across winding PB2 to counteract the counter-electromotive force generated by winding PB2. As it will be easily understood contacts R15-1 and R16-1 control the release of the brake and are operated at the same time as motor M2 driving the front unit.

The control circuit illustrated in FIG. 7 is for an eight position setwork and therefore includes eight push buttons referred to as POS1 to POS8. Each push button except the first and the last one have one normally open contacts (POS2-1) and two normally closed contacts (POS2-2 and POS2-3). The first push button has a normally open contact POS1-1 and a single normally closed contact POS1-2. The last push button has a normally open contact POS8-1 and a single normally closed contact POS8-3. The push buttons POS1 to POS8 are associated with the operation of a group of relays which control the selection of the various positions of the saw blades. The operation of push button POS1, for example, will energize relay R1 through normally closed contacts R17-1 or relay R17 to be disclosed later and through the normally closed contacts POS2-3 to POS8-3. Relay R1 locks itself operated through its own contact R1-1. The opening of the normally closed contact POS1-2 of push button POS1 will release any other relay associated with any other previous settings of the saw blades. Similarly, the operation of push button POS7 will operate relay R7 which will lock operated through its own contact R7-1. The opening of contact POS7-3 will automatically release any selection relay associated with positions POS1 to POS6. Similarly, the opening of contact POS7-2 will automatically release relay R8 if such relay has been previously operated. It will be clearly seen that the operation of any of the push buttons POS1 to POS8 will operate the corresponding relays R1 and R8 and that such relays will lock operated through their own contacts R1-1 to R8-1. It will also be understood that the operation of any of the push buttons POS1 to POS8 will open the normally closed contacts associated therewith to automatically cancel any previous settings of the saw blades. Finally, pilots lights P1 to P8 are connected across relays R1 to R8 to indicate the positions selected.

Relays $CR_1IN$, $CR_1OUT$, CR1 to CR8 as well as limit switches LS1 to LS8 are used in memory circuits which determine the direction of movement of the motor M1 driving the rear sliding bases of the quadruple band saw and also ensure the stopping of the motor at the selected position. When the rear sliding bases are moving from one position to the other, the limit switches LS1 to LS8 are operated by the cams of cam box 40 at each position but are released immediately after. The position of limit switches LS1 to LS8 illustrated in FIG. 7 corresponds to the released position of the limit switches. For example, when the rear sliding bases leave position POS1, representing the minimum setting of the saw blades, towards a higher setting, limit switch LS1 is released and when the sliding bases reach position POS2, limit switch LS2 is operated. The operation of limit switch LS2 operates relay CR1 which lock operated on its own contact CR1-1 through the then released limit switch LS1. Similarly, when the sliding bases leave position POS2, limit switch LS2 is released and when the sliding bases reach position POS3, limit switch LS3 is operated. The same operation will be repeated upon movement of the rear sliding bases towards higher positions POS4 to POS8, thus operating relays CR3 to CR6.

It will be noted that the relays CR1 to CR6, when operated by the passage of the sliding bases, remain operated and therefore maintain contacts CR1-2 to CR6-2 closed and contacts CR1-3 to CR6-3 open. The state of the above mentioned contacts CR1-2 to CR6-2 and CR1-3 to CR6-3 determines the direction that the sliding bases will take, that is the direction of rotation of the motor M1 driving the sliding bases as follows:

Let us assume that the sliding bases are in position POS1 and that it is desired to move them to position POS3. The operation of push button POS3 will energize relay R3 which will lock operated through its own contact R3-1 and also operate contact R3-2. The closure of contact R3-2 will energize relay $CR_1OUT$ through normally closed contacts CR2-3 and $CR_1 IN-1$ of released relays CR2 and $CR_1IN$. Relay $CR_1OUT$ will close contact $CR_1OUT-2$ to energize relay $M_1OUT$ and relay R10. The energization of relay R10 will release the brake as mentioned previously and the energization of relay $M_1OUT$ will operate contact $M_1OUT-1$ to cause the motor $M_1$ to rotate in the direction to move the sliding bases out towards position POS3. When the sliding bases reach position POS3, the corresponding cam of the cam box 40 will operate limit switch LS3 to deenergize relay $CR_1OUT$ which, in turn, will release relays R10 and $M_1OUT$.

Let us assume now that it is desired to return the sliding bases to position POS2. Of course, push button POS2 will be operated and relay R2 will be energized closing contact R2-1 to lock itself operated and contact R2-2. The previous movement of the sliding bases toward position POS3 has operated relays CR1 and CR2 to close contacts CR1-2 and CR2-2 and open contacts CR1-3 and CR2-3. The opening of contact CR1-3 combined with the closure of contact CR1-2 thus complete a circuit for energizing relay $CR_1IN$ instead of relay $CR_1OUT$. The energization of relay $CR_1IN$ will close contact $CR_1IN-2$ in the circuit of relays R9 and $M_1$ IN. The energization of relay R9 will open contact M9-1 to release the magnetic brake of the motor M1. The energization of relay $M_1IN$ will close contact $M_1IN-1$ to operate motor M1 in the opposite direction to move the sliding bases in.

It will therefore be understood from the above that relays CR1 to CR6 act as memory elements and determine the direction of rotation of the motor M1 and therefore the direction of movement of the sliding bases. Of course, the circuits associated with positions POS1 and POS8 do not require a memory circuit since they represent the limit positions of the sliding bases and may be reached from one direction only.

The limit switch LS1 is used to stop the sliding bases at position POS1 when selected. In addition, limit switch LS1 is also used as a safety switch at the minimum setting position of the quadruple band saw. Limit switch LS9 is used as a safety switch in the circuit of relay $M_1OUT$ for stopping the motor M1 at the maximum setting position. In addition, two additional limit switches LS10 and LS11 are used on the fixed frame of the quadruple band saw to deenergize relays $M_1IN$ and $M_1OUT$ respectively upon failure of the other limit switches.

Pilot light P9 is connected in series with normally closed contacts $CR_1IN-3$ and $CR_1OUT-3$ to indicate that the sliding bases have reached their selected position.

It will also be noted that an overload device OL is connected in series with relays $M_1IN$ and $M_1OUT$ for protecting the motor $M_1$ against overload.

The control circuit of the front motor M2 as illustrated in FIG. 8 is for a four position setwork. The positioning of the sliding bases driven by motor M2 of the front drive unit is effected by means of four push buttons POS10 to POS13. Each push button except the first and the last one have a normally open contact (POS11-1) and two normally closed contacts (POS11-2 and POS11-3). The first push button has a normally open contact POS10-1 and a single normally closed contact POS10-2, whereas the last push button POS13 has a normally open contact POS13-1 and a single normally closed contact POS13-3. The push buttons POS10 to POS13 are associated with the operation of a group of relays R11 to R14 respectively which control the selection of the new settings of the front saw blades and the cancellation of the previous settings in a manner similar to the rear saw blades. Consequently, the description of the operation of relays R11 to R14 will be omitted since it is identical to the operation of relays R1 to R8 associated with the selection of the settings of the rear saw blades. Relays R11 to R14 are also associated with pilot lights P11 to P14 which indicate the selection made.

Relays CR7 to CR10 in combination with limit switches LS13 to LS16 determine the stopping position of the sliding bases moved by the motor M2 of the front unit. Relays CR7 to CR10 perform the same function as relays CR1 to CR6 associated with the rear drive unit and act as memory elements for determining the direction of rotation of the motor driving the front saw blades. Similarly, the limit switches LS13 to LS16 are operated upon the passage of the sliding bases at each position and are subsequently released to the position illustrated in FIG. 8 after passage of the sliding bases.

Timing-relay T1 is connected across lines L3 to L4 and is operated upon closure of switch (FIG. 7). Timing-relay T1 has normally closed contacts T1-1 in the energization circuit of relay CR7. Shortly after energization of timing relay T1, contacts T1-1 are open but relay CR7 has enough time to lock operated through its own contact CR7-1 and limit switch LS12.

Let us assume now that the sliding base is moving from its minimum presetting position POS10 to position POS12. The operation of push button POS12 will operate relay R13 which will lock operated through its own contact R13-1 and also close contact R13-2 to energize relay $CR_2OUT$ through limit switch LS15 associated with position POS12 and through normally closed contacts CR9-2 and $CR_2IN-1$. The operation of relay $CR_2OUT$ will close contact $CR_2OUT-2$ to operate relays R16 and $M_2OUT$. The operation of $M_2OUT$ will close contact $M_2OUT-1$ in the energizing circuit of motor M2. When the sliding bases, in moving from position POS10 to POS12, leave position POS10, relay CR7 is maintained energized through its own contact CR7-1 and, when the sliding bases pass position POS11 and reach position POS12, relays CR8 and CR9 are successively operated by limit switches LS14 and LS15 and lock operated through their own contacts. It will be noted that the operation of relays CR7 to CR9 open contacts CR7-2 to CR9-2 and close contacts CR7-3 to CR9-3. The closure of contacts CR7-3 to CR9-3 prepares a circuit for the energization of relay $CR_2IN$ for returning the sliding bases to positions POS10 or POS11 if it is later on required. It is therefore seen that relays CR7 to CR10 act as memory elements for controlling the direction of movement of the sliding bases.

Assuming now that push button POS11 is pushed, relay R12 will be energized and lock operated through its own contact R12-1. The operation of push button POS11 will open contacts POS11-2 and POS11-3 to release relay R13 previously operated. The operation of relay R12 will also close contact R12-2 to energize relay $CR_2IN$ through limit switch LS14 associated with position POS11 and now closed contacts CR7-3 and CR8-3. The operation of relay $CR_2IN$ will close contact $CR_2IN-2$ and energize relay R15 and relay $M_2IN$. The energization of relay $M_2IN$ closes contact $M_2IN-1$ to cause the motor M2 to rotate in a direction opposite to the previous direction to return the sliding bases to position POS11. Upon arrival of the sliding bases at position POS11, limit switch LS14 is operated to release relay $CR_2IN$ and to stop the motor. As mentioned previously, relays R15 and R16 control the energization of brake winding PB2.

Limit switches L17 and L18 are positioned directly on the frame of the quadruple band saw and open the circuit of the motor M2 directly in case of failure of the limit switches LS13 to LS16 when the sliding bases reach a maximum or a minimum setting position.

Limit switch LS19 is a safety switch in the circuit of relay $M_2$OUT for stopping the motor M2 at the maximum setting position.

Relay R17 is energized by a push button EM-STOP which may be operated in case of an emergency to cause immediate stopping of the front and rear motors. The energization of relay R17 opens contact R17-1 (FIG. 7) and R17-2 (FIG. 8) to deenergize relays R1 to R8, and R11 and R14. However, relays CR1 to CR10 which are energized directly from line L1 to L3 are not affected by the operation of the emergency push button EM-STOP and thus keep memorizing the position of the sliding bases.

Pilot light P15 is connected in series with normally closed contacts $CR_2$IN-3 and $CR_2$OUT-3 and is used to indicate that the sliding bases have reached the selected position.

Let us now consider the simultaneous operation of the two drive units 16 and 18 when the setting of the rear saw blades is changed towards a lower setting position and that it is desired to maintain a preset distance between the front and rear saw blades. For example, let us assume that the front saw blades are positioned at position POS10 corresponding to a predetermined distance between the front and rear saw blades and that it is required to maintain such position whatever may be the displacement desired for the rear saw blades. As mentioned previously, upon displacement of the rear sliding bases following a new lower setting of the rear saw blades, the cams of the cam box will be displaced and, consequently, limit switch LS13 associated with position POS10 will be released. The release of limit switch LS13 combined with the energization of relay CR7 through limit switch LS12, and with the energization of relay R11 associated position POS10 will energize relay $CR_2$IN to cause the movement of the drive unit of the front sliding bases to follow the movement of the rear sliding bases. When the rear sliding bases reach their new position, the cam of the cam box 78 corresponding to position POS10 will operate limit switch LS13 to release $CR_2$IN and thus stop the front drive unit. The relative setting between the front and rear sliding bases is thus maintained.

It will be understood that the limit switch LS12 is not associated with any of the positions of the front sliding bases. Such limit switch is used to determine the direction of movement of the front sliding bases when positioned at position POS10 upon setting of a higher position for the rear sliding bases. When limit switch LS12 is opened due to the displacement of the rear sliding bases outwardly and relay CR7 is thus released, relay $CR_2$OUT will be operated to cause the drive unit of the front sliding bases to move the front saw blades outwardly.

Figure 10:
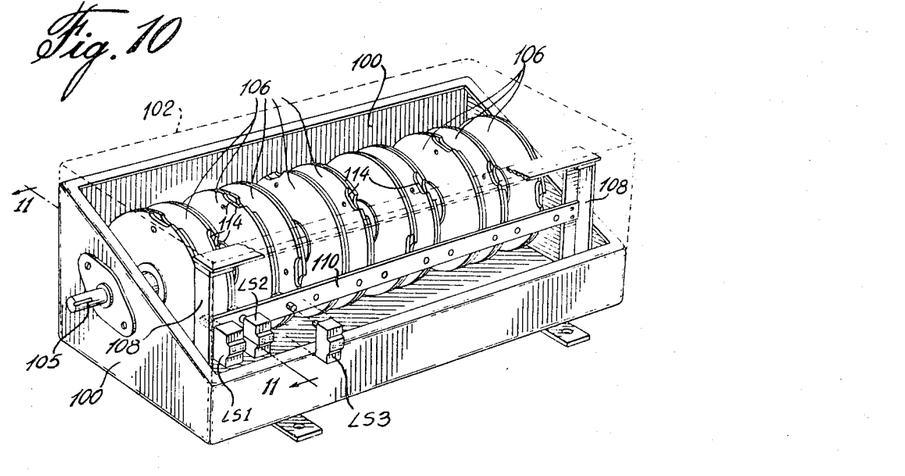
FIG. 10 illustrate a perspective view, with the cover removed, of a cam box used in the invention.
Figure 11:
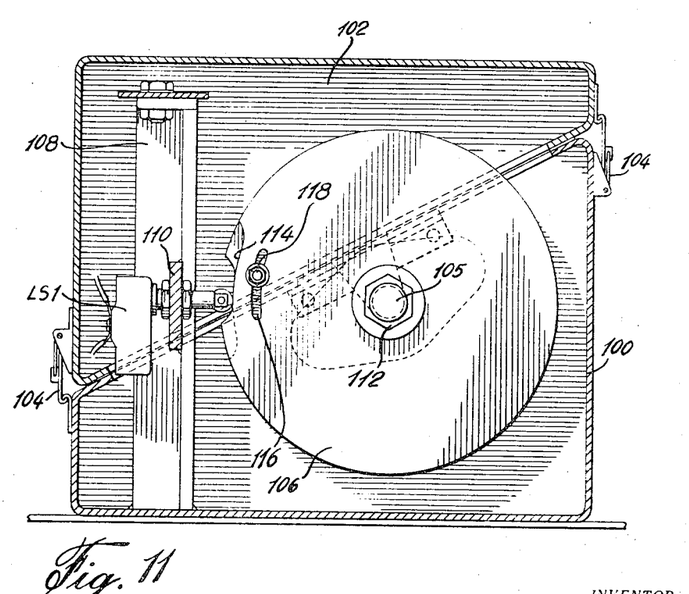
FIG. 11 illustrates a section view through line 11—11 of the cam box of FIG. 10.

Referring to FIGS. 10 and 11, each cam box 40 or 78 comprises a housing 100 having a cover 102 secured thereto by locking devices 104. Within housing 100 is mounted for rotation a shaft 105 upon which are secured a number of cams 106. Within the housing, there is provided a structure 108 holding a transversal bar 110 upon which are mounted limit switches such as limit switches LS1 to LS8 to LS13 to LS16 of FIGS. 7 and 8. The switches LS1 to LS8 to LS13 to LS16 of FIGS. 7 and 8. The shaft 105 is threaded and the angular position of the cams in front of the limit switches is fixed by means of screws such as the one illustrated at 112 in FIG. 11.

In order to permit easy adjustment of the length of the depression 114 in the cams 106, each cam is made of two discs each having a depression therein, and the adjustment is made by means of a slot 116 in one disc and a cap screw 119 threaded into a top hole in the other disc. By adjusting the angular position of the two discs with respect to each other, the length of the depression 114 may be varied at will. It may be noted here that the angular position of the cams 106 on the shaft will determine the stopping position of the saw blades. In order to change the angular position of the cams, the nuts 112 are loosened up and the two locked discs of the cam 106 are adjusted to their proper position. Once the cam is adjusted in position, screw 112 is tightened. It is to be understood that each cam box contains a number of cams which is dependent upon the number of limit switches required, such number of limit switches being itself dependent upon the desired number of settings of the quadruple band saw.

I claim:

1. A system for controlling the setting of a quadruple band saw having a fixed frame, a pair of rear and a pair of front sliding bases slidably mounted on said fixed frame and respectively supporting a pair of saw blades, and a drive unit for operating each pair of sliding bases in synchronism, said system comprising:
    a. a first device including means for controlling the drive unit of the rear pair of sliding bases; and
    b. a second device including means for controlling the drive unit of the front pair of sliding bases to adjust the distance of the front pair of saw blades with respect to the rear pair of saw blades when the rear pair of saw blades is stationary and means responsive to movement of said pair of rear sliding bases under the control of said first device to energize the front drive unit for maintaining a preset relative distance between the front pair of saw blades and the rear pair of saw blades when the rear pair of saw blades is moving.

2. A system as defined in claim 1, wherein said means for controlling the drive unit of the rear pair of sliding bases includes switching means located in the energizing circuit of the rear drive unit and corresponding to the number of preset positions of said rear pair of saw blades, and positioning means responsive to movement of said rear sliding bases a distance corresponding to a preset position for operating a corresponding one of said switching means to deenergize the rear drive unit.

3. A system as defined in claim 2, wherein the switching means are limit switches and wherein said positioning means includes a first chain sprocket mounted for rotation on said frame, a cam box secured to said fixed frame and having a main shaft carrying a number of cams for operating said limit switches and a second chain sprocket secured to the end of said shaft, and a chain passing around said first and second sprockets and having both ends thereof secured to said sliding bases whereby energization of said rear drive unit will cause movement of said chain and rotation of the cam box shaft until a limit switch corresponding to a preset position is operated to deenergize said rear drive unit.

4. A system as defined in claim 1, wherein said means for controlling the drive unit of the front pair of sliding bases includes switching means positioned in the energizing circuit of the drive unit of the front pair of saw blades and corresponding to the number of preset positions of said front pair of saw blades, and positioning means associated with said front sliding bases and responsive to the displacement of the front sliding bases when the rear sliding bases are stationary for operating one of said switching means corresponding to a preset position of said front saw blades to deenergize the front drive unit when said preset position has been reached.

5. A system as defined in claim 4, wherein said switching means are limit switches and wherein said positioning means includes two brackets fastened to the fixed frame respectively at the rear and front saw sides, a shaft journalled in said brackets, first chain sprockets keyed one on each end of said shaft, second chain sprockets freely mounted one on each bracket, a chain coupling the chain sprockets on the front side of the quadruple band saw and having both ends thereof secured to said front sliding bases whereby movement of said front sliding bases will rotate said chain sprockets and the shaft coupled to said first chain sprockets, a cam box mounted on one of the rear sliding bases and including a main shaft carrying a number of cams operating said limit switches, a third chain sprocket secured to the end of the cam box shaft, and a second chain interconnecting the first chain sprocket on the rear end of said shaft and said third chain sprocket, whereby displacement of the second chain due to the rotation of said first mentioned shaft will cause rotation of the shaft of said cam box, whereas the displacement of the cam box due to the movement of the rear sliding bases when the front sliding bases are stationary will automatically rotate the shaft of the cam box to displace the cams and energize the front drive unit to follow the rear drive unit, thus maintaining a relative distance between the rear and front pairs of saw blades.

6. A system as defined in claim 5, further comprising additional chain sprockets freely mounted on said sliding bases and coupled by said second chain, said additional sprockets being positioned on either side of said first mentioned shaft to compensate for the variations in the distance between said first mentioned shaft and the shaft of the cam box when the rear sliding bases are moved.

7. A system as defined in claim 1, further comprising a control circuit including position selection switches, selection relays responsive to the operation of said selection switches, switching means located in the energizing circuit of said drive units and operated by said first and second devices, and memory elements responsive to said selection switches and to said switching means for determining the direction of movement of said drive units and for ensuring stopping of the sliding bases at the selected positions.

8. A system as defined in claim 3, wherein each cam of said cam box is made of two discs having a depression at the circumference thereof, said two discs being placed in contact with each other and positioned in such a way as to provide an overall depression which may be varied in length by relative rotation of one disc with respect to the other.

9. A system as defined in claim 5, wherein each cam of said cam box is made of two discs having a depression at the circumference thereof, and wherein said two discs are brought in contact with each other in such a manner as to provide an overall depression of variable length when the two discs are moved with respect to each other.

* * * * *